(12) United States Patent
Reiter et al.

(10) Patent No.: US 11,009,057 B2
(45) Date of Patent: May 18, 2021

(54) METHOD FOR CONNECTING TWO COMPONENTS, AND COMPONENT ARRANGEMENT

(71) Applicant: Bayerische Motoren Werke Aktiengesellschaft, Munich (DE)

(72) Inventors: Helmut Reiter, Pfaffenhofen (DE); Udo Reilaender, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 78 days.

(21) Appl. No.: 16/220,051

(22) Filed: Dec. 14, 2018

(65) Prior Publication Data

US 2019/0120270 A1    Apr. 25, 2019

Related U.S. Application Data

(63) Continuation of application No. PCT/EP2017/061789, filed on May 17, 2017.

(30) Foreign Application Priority Data

Jun. 15, 2016    (DE) ...................... 10 2016 210 664.3

(51) Int. Cl.
*F16B 11/00* (2006.01)
*B29C 65/48* (2006.01)
(Continued)

(52) U.S. Cl.
CPC .......... *F16B 11/006* (2013.01); *B29C 65/483* (2013.01); *B29C 65/565* (2013.01);
(Continued)

(58) Field of Classification Search
CPC ....... B29C 65/00; B29C 65/48; B29C 65/483; B29C 65/4835; B29C 65/56;
(Continued)

(56) References Cited

U.S. PATENT DOCUMENTS 3,482,125 A * 12/1969 Fleckenstein .......... H02K 15/16
                                                              310/51
3,784,235 A *  1/1974 Kessler ................... B29C 65/48
                                                              285/94
(Continued)

FOREIGN PATENT DOCUMENTS

CN    102003438 A    4/2011
CN    103443560 A    12/2013
(Continued)

OTHER PUBLICATIONS

International Search Report (PCT/ISA/210) issued in PCT Application No. PCT/EP2017/061789 dated Jul. 7, 2017 with English translation (five (5) pages).
(Continued)

*Primary Examiner* — Philip C Tucker
*Assistant Examiner* — Brian R Slawski
(74) *Attorney, Agent, or Firm* — Crowell & Moring LLP (57) ABSTRACT

A method for the connection of a first component to a second component includes providing a first component which has a projection with an undercut, and providing a second component which has a cavity. The method also includes introducing a sealing and/or connecting material into the cavity of the second component, and joining the first component and the second component together to form a component arrangement. The projection of the first component projects, in the joined state, into the cavity of the second component.

19 Claims, 4 Drawing Sheets

(51) Int. Cl.
| | |
|---|---|
| *B29C 65/00* | (2006.01) |
| *B32B 7/05* | (2019.01) |
| *B32B 3/30* | (2006.01) |
| *B29C 65/72* | (2006.01) |
| *B29C 65/56* | (2006.01) |
| *F16B 17/00* | (2006.01) |
| *B29C 65/60* | (2006.01) |
| *F16B 3/00* | (2006.01) |

(52) U.S. Cl.
CPC .......... *B29C 65/568* (2013.01); *B29C 65/608* (2013.01); *B29C 65/72* (2013.01); *B29C 66/12421* (2013.01); *B29C 66/3032* (2013.01); *B29C 66/43* (2013.01); *B32B 3/30* (2013.01); *B32B 7/05* (2019.01); *B32B 2307/7242* (2013.01); *F16B 3/00* (2013.01); *F16B 17/00* (2013.01)

(58) Field of Classification Search
CPC ... B29C 65/565; B29C 65/567; B29C 65/568; B29C 65/58; B29C 65/60; B29C 65/606; B29C 65/608; B29C 65/72; B29C 66/00; B29C 66/05; B29C 66/12; B29C 66/124; B29C 66/1242; B29C 66/12421; B29C 66/12423; B29C 66/12425; B29C 66/126; B29C 66/139; B29C 66/303; B29C 66/3032; B29C 66/30321; B29C 66/30325; B29C 66/43; F16B 3/00; F16B 11/006; F16B 17/00; F16B 17/008; B32B 7/08; B32B 7/12; B32B 37/12; B32B 37/1207; B32B 37/1253; B32B 7/05; B32B 3/30; B32B 2307/7242; Y10T 428/24008; Y10T 428/2457; Y10T 428/24479
USPC ......... 156/60, 71, 87, 91, 92, 196, 212, 221, 156/242, 244.11, 244.15, 244.24, 244.25, 156/245, 290, 291, 292, 293, 295, 338; 264/248, 249, 273, 274; 428/138, 139, 428/140, 156, 161, 163, 166, 167
See application file for complete search history.

(56) References Cited

U.S. PATENT DOCUMENTS

| | | | | |
|---|---|---|---|---|
| 3,811,141 A | * | 5/1974 | Stoeberl | B29C 65/58 114/357 |
| 4,576,846 A | * | 3/1986 | Noel | B29C 65/58 428/36.5 |
| 5,022,685 A | * | 6/1991 | Stiskin | F16B 5/002 |
| 5,363,628 A | * | 11/1994 | Basar | E06B 3/277 264/249 |
| 6,406,636 B1 | * | 6/2002 | Vaganov | B23K 1/0016 216/2 |
| 6,436,502 B1 | * | 8/2002 | Swift | B29C 65/56 428/60 |
| 2003/0003258 A1 | * | 1/2003 | Durso | B29C 66/12421 428/53 |
| 2004/0028894 A1 | * | 2/2004 | Ueno | B29C 66/30325 428/343 |
| 2005/0247756 A1 | * | 11/2005 | Frazer | B64C 3/26 228/101 |
| 2007/0075543 A1 | * | 4/2007 | Marx | B29C 66/12441 285/331 |
| 2007/0261787 A1 | * | 11/2007 | Malis | B29C 65/7855 156/285 |
| 2008/0295438 A1 | * | 12/2008 | Knauseder | E04F 15/04 52/589.1 |
| 2010/0310829 A1 | * | 12/2010 | Yada | H05K 3/0097 428/172 |
| 2011/0113629 A1 | | 5/2011 | Nava et al. | |
| 2014/0000584 A1 | | 1/2014 | Raucher et al. | |
| 2016/0304206 A1 | * | 10/2016 | Von Ahlen | B29C 65/56 |
| 2017/0157474 A1 | * | 6/2017 | Sander | A63B 53/0475 |
| 2017/0314591 A1 | * | 11/2017 | Baker | F16B 5/002 |

FOREIGN PATENT DOCUMENTS

| | | | |
|---|---|---|---|
| DE | 37 29 104 A1 | 3/1989 | |
| DE | 101 55 312 A1 | 5/2003 | |
| DE | 10 2008 010 884 A1 | 9/2009 | |
| EP | 2 292 709 A2 | 3/2011 | |
| FR | 2 629 149 A1 | 9/2009 | |
| GB | 1177450 A * | 1/1970 | ....... B29C 66/12441 |
| JP | 07237267 A * | 9/1995 | ....... B29C 66/1142 |

OTHER PUBLICATIONS

German-language Written Opinion (PCT/ISA/237) issued in PCT Application No. PCT/EP2017/061789 dated Dec. 21, 2017 (four (4) pages).

German Search Report issued in counterpart German Application No. 10 2016 210 664.3 dated May 16, 2017 with partial English translation (eleven pages).

English translation of Chinese Office Action issued in counterpart Chinese Application No. 201780016174.9 dated Jul. 1, 2019 (seven (7) pages).

* cited by examiner

METHOD FOR CONNECTING TWO COMPONENTS, AND COMPONENT ARRANGEMENT

CROSS REFERENCE TO RELATED APPLICATIONS

This application is a continuation of PCT International Application No. PCT/EP2017/061789, filed May 17, 2017, which claims priority under 35 U.S.C. § 119 from German Patent Application No. 10 2016 210 664.3, filed Jun. 15, 2016, the entire disclosures of which are herein expressly incorporated by reference.

BACKGROUND AND SUMMARY OF THE INVENTION

The embodiments of the present invention relate to a method for the sealed and/or positively locking and/or non-positively locking connection of a first component to a second component. The embodiments of the invention also relate to a component arrangement which has a sealed and/or positively locking and/or non-positively locking connection between a first component and a second component.

Two components can be arranged in a sealed and/or positively locking and/or non-positively locking manner. Here, there must always be a sealed and/or positively locking and/or non-positively locking connection between the components to be connected.

However, existing connected components can lift off from one another during operation. Furthermore, it is often the case that different coefficients of thermal expansion exist owing to different materials from which the components are manufactured, whereby the components behave differently in the event of temperature changes. For these two reasons, relative movements between the components occur, which must be compensated by means of the conventional connecting technology.

A problem addressed by at least some embodiments is therefore that of specifying a method for the sealed and/or positively locking and/or non-positively locking connection of two components, which method, while being simple and inexpensive to implement, permits secure and reliable sealing and/or straightforward connection of the components with respect to one another. A further problem addressed by the embodiments of the invention is that of specifying a correspondingly sealed and/or positively locking and/or non-positively locking component arrangement.

Said problems are solved by means of method, a first component, which has a projection with an undercut, and a second component, which has a cavity, are provided. The cavity may for example form a sealing and/or connecting region. Furthermore, a sealing and/or connecting material, that is to say a material which has a sealing and/or connecting function, is introduced into the cavity. The sealing and/or connecting material may for example be a liquid or pasty material. For example, the material may be a sealing material for sealing with respect to gaseous and/or liquid media, for example may be silicon or acrylic. Furthermore, the material may be a connecting material for the positively locking and/or non-positively locking connection of the components, such as for example a bonding material or an adhesive. For example, the adhesive may be a curing adhesive, such as for example a chemically curing adhesive. Furthermore, the connecting material may for example be concrete or tar. The material preferably has mechanical, chemical and thermal resistances in accordance with the application. Furthermore, the sealing and/or connecting material may be a sealing and connecting material, that is to say may be formed in combination as connecting material for the positively locking and/or non-positively locking connection of the components and as sealing material.

The first component and the second component are subsequently joined together to form a component arrangement, wherein the projection of the first component projects, joined-on state, into the cavity of the second component.

Preferably, projection of the first component likewise projected into the sealing and/or connecting material. For example, the first component may be joined to the second component such that the projection is fully surrounded by the sealing and/or connecting material.

As a result of the engagement of the projection into the cavity, provision may in particular also be made for the projection to engage into the sealing and/or connecting material and to at least partially displace said material. In particular, the cavity may be fully filled with the sealing and/or connecting material at least after the joining-together of the first component and the second component.

By means of the undercut of the projection, the component arrangement exhibits a particularly firm and/or sealed connection in the joined state. For example, the projection may be of undercut form in relation to a joining axis which runs substantially parallel to an intended loading direction of the component arrangement. Here, the expression "intended loading direction" may refer to a direction in which forces act during intended use of the joined component arrangement, for example in which the greatest forces act during intended use. The joining axis may for example run orthogonally with respect to a parting plane, wherein the parting plane, at least in sections, runs tangentially with respect to an opening region of the cavity and/or with respect to a base region of the cavity and/or with respect to a surface, adjoining the projection, of the first component. Furthermore, the projection may have one or more undercut regions.

The projection may also have a first width and a second width, wherein, in the joined state, the second width is arranged closer to the base region of the cavity than the first width. The second width is preferably greater than the first width. For example, the projection or the cross-sectional area of the projection may widen or become larger in the direction of the base region of the cavity. The projection may for example widen continuously in the direction of the base region of the cavity. Alternatively, the projection may also widen only in sections in the direction of the base region of the cavity. It is furthermore possible for the projection to be inclined relative to the joining axis, such that an undercut is formed as a result of the inclination of the projection.

The cavity may also have an opening region and a base region, wherein the opening region is larger than the base region. For example, the cavity may narrow proceeding from the base region in the direction of the opening region.

The first component may also have a multiplicity of projections and the second component may also have a multiplicity of cavities and/or sealing and/or connection regions, wherein, in the joined state, at least in each case one projection projects into a cavity or a sealing and/or connecting material arranged in the cavity. It is preferable for all projections to have an undercut.

An outer wall of the cavity of the second component may be deformed during the joining-together step. The deformation of the outer wall may for example involve a bending of the outer wall. The deformation may be performed either mechanically, chemically or in some other way, and in particular before or during the joining-together of the first component and the second component.

After the deformation of the outer wall, curing of the sealing and/or connecting material may take place, in a manner dependent on the usage situation, to form an elastic or solid sealing and/or connecting element. Thus, after the curing, an elastic or solid sealing and/or connecting element may be provided which ensures a sealing action and/or a connecting action between the first component and the second component. Provision is made here whereby, as a result of the deformation of the outer wall of the cavity and the curing of the sealing and/or connecting material, a lift-off of the first component and second component from one another leads to a compression of the elastic and/or solid sealing and/or connecting element between deformed outer wall and projection. Thus, by contrast to the prior art, the elastic or solid sealing and/or connecting element is compressed, whereby the sealing and/or connecting action is intensified and, in particular, porosities caused during the application of the sealing and/or connecting means are minimized. In the prior art, it is rather the case that a lift-off of the components with respect to one another leads to a deterioration of the sealing and/or connecting action. The sealing material is advantageously a pasty or liquid sealing material which has curing characteristics. After the curing, the elastic and/or solid sealing and/or connecting element that is formed can, during the loading, be subjected both to shear and compressive loading. Thus, the sealing and/or connecting material, which exhibits low viscosity, can be applied to the first component and/or the second component, wherein an elastic or solid sealing and/or connecting element is present after the curing.

The deformation of the outer wall of the cavity may take place in particular plastically or elastically. If it is the intention for the first component and the second component to be separable from one another at a later point in time, then provision is advantageously made for the outer wall of the sealing and/or connecting region to be elastically deformed. For this purpose, a separating agent between component wall and sealing and/or connecting element may have an assisting effect depending on the usage situation. By contrast, if such separation is not intended, the outer wall of the cavity may also be plastically deformed. By means of the deformation of the outer wall, it is ensured that a movement of first component and second component with respect to one another always is generated to a compression of the elastic or solid sealing and/or connecting element between the outer walls.

The projection may be of thickening, in particular club-like form. For example, the projection may manufacture toward a free end. Alternatively, the projection may be formed into a thickening, in particular club-like form by means of a deformation step before the joining-together step or during the joining-together. It is particularly advantageously also possible for the projection to be formed into a thickening, in particular club-like form before the step of the introduction of the sealing and/or connecting material. Formation into a thickening, in particular club-like form is performed in particular by virtue of a projection with an arbitrary, in particular rectangular, cross section being deformed by application of a force using a punch. By means of the thickening form, in particular the club-like form, which within the component arrangement is fully surrounded by the sealing and/or connecting material and thus the elastic sealing element, a compression force can be applied to the elastic or solid sealing and/or connecting element at all times in the event of a lift-off of the first component from the second component. In particular, the sealing and/or connecting element may be compressible by the thickening form, in particular the club-like form, and the deformed outer wall of the cavity.

It is thus ensured that an adequate functional action is imparted by the sealing and/or connecting element at all times. This is the case even if the first component and the second component move relative to one another owing to external operating circumstances.

The at least one outer wall of the cavity is advantageously deformed during the joining-together step. Here, the deformation may advantageously be performed using a dedicated tool or using the respective other component.

The first component particularly advantageously has an opposing wall which bears against the outer wall when the first component and the second component have been joined together to form the component arrangement. Furthermore, the opposing wall leads to a deformation, in particular to a bending, of the outer wall within the component arrangement. In this way, the method is simplified because the deformation step is automatically performed together with the step of the joining-together of the first component and the second component. There is therefore no need to perform a dedicated deformation of the outer wall.

The outer wall is advantageously deformed such that a cross section of the cavity is of arcuate form. This is advantageous in particular together with the club-like form of the projection, because a club-like form and arcuate form are substantially complementary to one another. Alternatively, the cross section is conical. Thus, a movement of the first component relative to the second component always leads to a compression of the sealing and/or connecting element between deformed outer wall and club-like projection. By means of a structurally optimal configuration of the projection and of the outer wall to be deformed, the sealing and/or connecting action is intensified. In this way, the sealing and/or connecting action between the first component and the second component is adequately provided at all times owing to the elastic and/or solid sealing and/or connecting element. The inventive method according thus makes it possible to provide a component arrangement which reliably ensures an adequate sealing and/or connecting action even in the event of a relative movement of the first component with respect to the second component.

Advantageously, before the joining-together of the first component and the second component, the outer wall is deformed such that a cross section of the cavity narrows toward a root region of the projection. For this purpose, provision is made for the first component and the second component to be situated in a joined-together state. In this way, provision is in turn preferably made whereby a movement of the first component relative to the second component always leads to a compression of the sealing and/or connecting element between the deformed outer wall and the projection. A sealing and/or connecting action is thus improved.

Provision is preferably furthermore made whereby the outer wall is thickened during and/or after the step of the curing of the sealing and/or connecting means. In particular, the outer wall is thickened into a club-like form. Provision is thus made whereby the cross section of the sealing region narrows toward a root region of the projection in the joined-together state of first component and second component. In this way, it is in turn ensured that a movement of the first component relative to the second component always leads to a compression of the sealing and/or connecting element. It is thus in turn ensured that the sealing and/or connecting action is improved.

At least one of the components may also have a guide element which projects into a depression of the other component during the joining-together of the components. Lateral forces can be advantageously absorbed by means of the guide element. It is furthermore possible for both the first component and the second component to each have one or more guide elements which, in the sensed state, each project into depressions of the respective other component.

The projection of the first component may be plastically deformed during the joining-together of the components. In the embodiment in which both the first component that is to say the second component have a projection, both projections may be plastically deformed during the joining-together.

A thickening of the projection, in particular at a free end of the projection, may take place during the curing or after the curing of the sealing and/or connecting material. In particular, the thickening is of club-like form. It is thus in turn ensured that a movement of the first component relative to the second component leads to a compression of the sealing and/or connecting element.

A component arrangement is also specified. The component arrangement may for example be producible or produced by means of a method described here. The component arrangement may thus have one or more features of the abovementioned embodiments described in conjunction with the method. The features described above and below may apply equally to the method described here and to the component arrangement described here.

The component arrangement comprises a first component, which has a projection with an undercut, and a second component, which has a cavity. The first component is connected to the second component. Furthermore, the component arrangement has a sealing and/or connecting material which has cured to form a sealing and/or connecting element and which is arranged in the cavity of the second component. The projection of the first component projects into the cavity of the second component. The projection is preferably at least partially surrounded by the sealing and/or connecting material. For example, the projection may be entirely surrounded by the sealing and/or connecting material.

Both the first component and the second component may have in each case one cavity and one projection with an undercut, wherein each projection projects into the cavity of the respective other component. The two components may for example be of identical or point-symmetrical construction with regard to their surface contour.

An outer wall of the cavity may be deformed in relation to a state in which the second component is not connected to the first component. The outer wall may in particular be bent. Provision is thus preferably made for the sealing and/or connecting element to be compressible if the first component lifts off from the second component because, in this case, the sealing and/or connecting element can be clamped between the deformed outer wall and the projection. Provision is particularly advantageously made for the component arrangement to be produced in accordance with the above-described method.

The first component and/or the second component preferably have an opposing wall which bears against the outer wall. As a result of the outer wall of one component bearing against an opposing wall of the other component, the outer wall is deformed, in particular bent. If it is the intention for only one of the two components to have the outer wall, then provision is made for only that component that does not have the outer wall to comprise the opposing wall. By means of the opposing wall, a deformation of the outer wall takes place autonomously, such that the deformation of the outer wall does not have to be performed in a dedicated step. Provision is particularly advantageously made for the outer wall to be deformed such that a cross section of the cavity is arcuate or wedge-shaped. Provision is particularly advantageously also made for the projection to be of thickened, in particular club-like form at one end. Thus, the projection and the cavity are advantageously of substantially complementary form with respect to one another. This has the effect in particular that a region of the sealing and/or connecting element is always compressible between deformed outer wall and projection if a separating relative movement between the first component and the second component takes place. By means of compression of the sealing and/or connecting element, the sealing and/or connecting action of the sealing and/or connecting element is intensified, whereby an improved sealing and/or connecting action between the first component and the second component is provided in any case.

The first component and/or the second component particularly advantageously has an overflow chamber. Sealing and/or connecting material that has emerged from the cavity can enter the overflow chamber, such that the excess sealing and/or connecting material that has emerged can be captured by the overflow chamber. The overflow chamber advantageously extends around the cavity. In particular, during the manufacture of the component arrangement, provision is made for the projection to be introduced into the cavity, whereby the sealing and/or connecting material is at least partially displaced out of the cavity. This displaced sealing and/or connecting material can subsequently be captured by the overflow chamber. The sealing and/or connecting material is thus prevented from being present in an uncontrolled manner between the first component and the second component. In this way, the sealing and/or connecting action can be limited to the cavity, whereby a quantity tolerance in the provision of the quantity of the sealing and/or connecting material, and manufacturing tolerances of the two components, can be compensated. It is thus ensured that, in any case, the sealing and/or connecting material is present throughout the entire cavity. A secure and reliable sealing and/or connecting action is therefore realized.

BRIEF DESCRIPTION OF THE DRAWINGS

Other objects, advantages and novel features of the present invention will become apparent from the following detailed description of one or more preferred embodiments when considered in conjunction with FIGS. 1A to 4B, in which.

DETAILED DESCRIPTION OF THE DRAWINGS

In the exemplary embodiments and figures, identical constituents or constituents of identical action may each be denoted by the same reference designations. The illustrated elements and the proportions thereof with respect one another should basically be regarded as not being to scale. Rather, for an improved illustration and/or for improved understanding, individual elements may be illustrated with exaggeratedly thick or large dimensions.

Figure 1A:
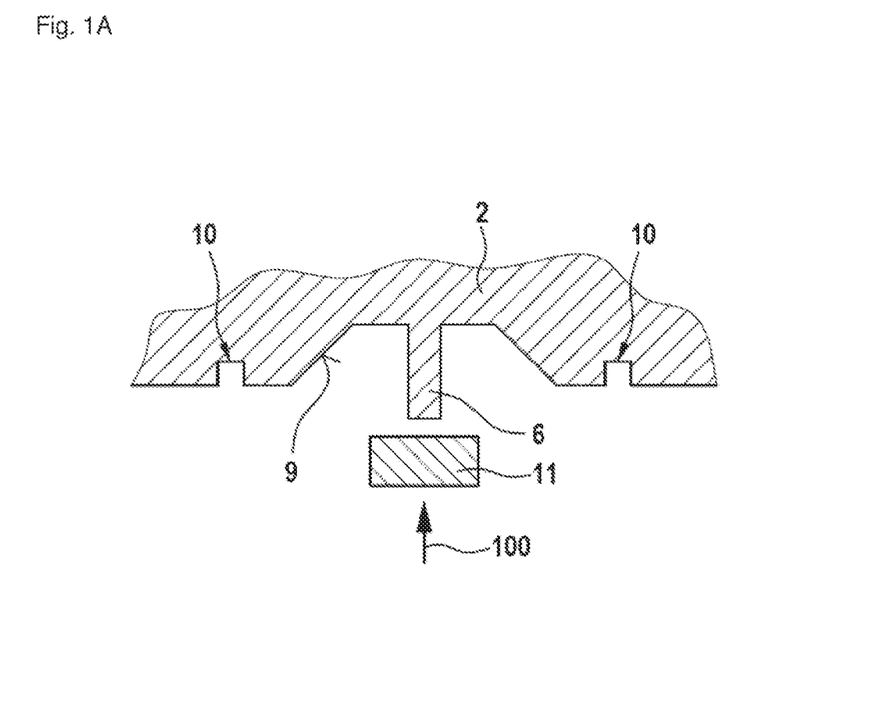
FIG. 1A is a schematic diagram of a first component of a component arrangement.
Figure 1B:
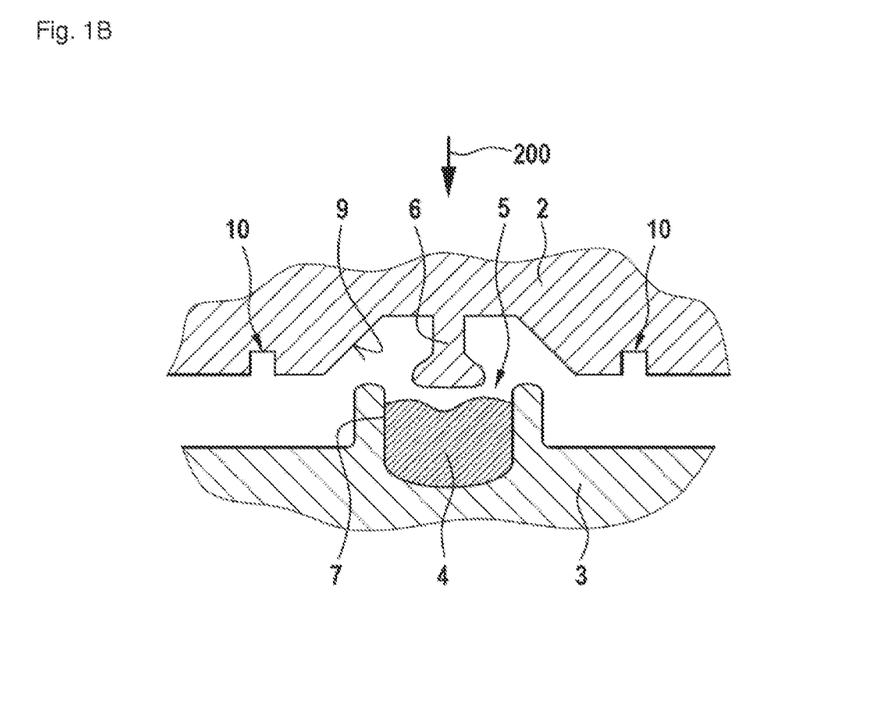
FIG. 1B is a schematic diagram of the first component and of a second component of the component arrangement during a manufacturing process.
Figure 1C:
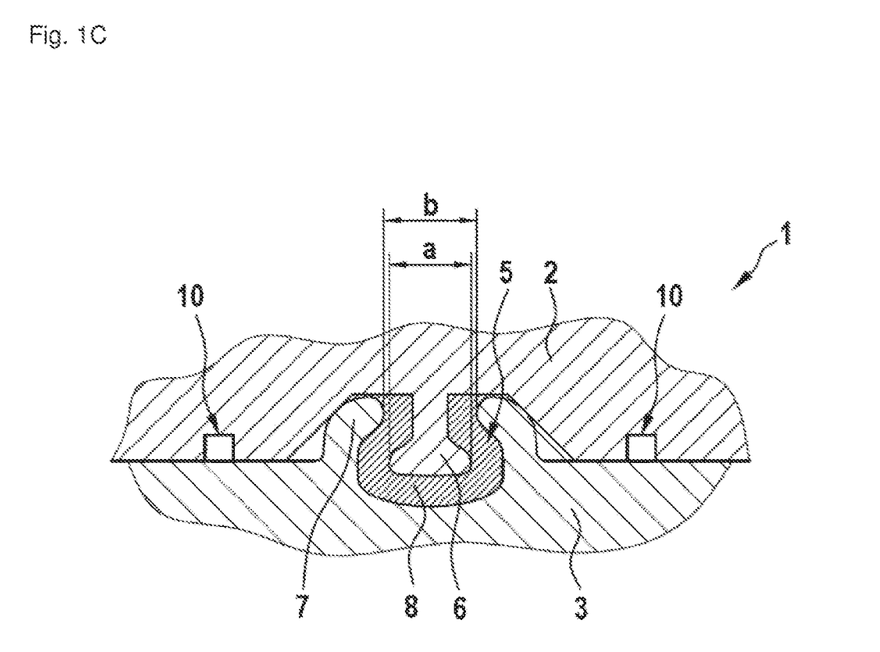
FIG. 1C is a schematic diagram of the component arrangement in a fully manufactured state.

FIG. 1A schematically shows a first component 2 which is intended to be connected to a second component 3 (see FIG. 1B) to form a component arrangement 1 (see FIG. 1C). An exemplary embodiment of the method according to the invention is used for this purpose.

FIG. 1A shows a first step of this method. A projection 6 of the first component 2 is deformed by means of a punch 11. The punch 11 is, for this purpose, moved toward the first component 2 along a first direction 100. In particular, in this way, a thickening deformation is performed at the end of the projection 6. This thickening deformation of the projection 6 is shown in FIG. 1B. The deformation is in particular of club-like form.

FIG. 1B shows a further step of the method for producing the component arrangement 1. For this purpose, the first component 2 is joined to the second component 3. The second component 3 has a cavity 5 which is delimited by outer walls 7. And, in particular pasty or liquid sealing and/or connecting material 4 is introduced into the cavity 5 and thus between the outer walls 7. The sealing and/or connecting material 4 is thus applied to the second component 3. The sealing and/or connecting material 4 advantageously has a low viscosity and is thus easily deformable and displaceable.

For the manufacture of the component arrangement 1, the first component 2 is mounted onto the second component 3, or vice versa, along a second direction 200, which can also be referred to here and below as joining direction. This has the effect that the projection 6 enters the cavity 5 and partially displaces the sealing and/or connecting material 4. Sealing and/or connecting material 4 thus flows out of the cavity 5. To capture the sealing and/or connecting material 4 that flows out, the first component 2 comprises overflow chambers 10, in which the sealing and/or connecting material 4 can be captured. The overflow chambers 10 may optionally also be formed in the component 3.

In FIG. 1B, it can furthermore be seen that the first component 2 has opposing walls 9. The opposing walls 9 are situated opposite the outer walls 7 of the cavity 5 of the second component 3. During the joining-together process of the first component 2 and of the second component 3, the outer walls 7 thus come into contact with the opposing walls 9. As soon as the outer walls 7 and the opposing walls 9 come into contact, a deformation of the outer walls 7 of the cavity 5 occurs during further movement of the first component 2 along the second direction 200. This can be seen from FIG. 1C. As soon as the first component 2 and the second component 3 have been joined together to form the component arrangement 1, the outer walls have been mechanically deformed to a maximum extent.

FIG. 1C schematically shows the component arrangement 1 that has been realized as a result of the first component 2 and second component 3 being joined together. Here, on the one hand, excess sealing and/or connecting material 4 that has been displaced out of the cavity 5 by the projection 6 has been collected in the overflow chambers 10 of the first component 2. At the same time, the outer walls 7 of the cavity 5 have been deformed. In this way, the cavity 5 with the deformed outer walls 7 has a cross section which is substantially arcuate. Since the projection 6 has been deformed into a club-like form, an outer contour of the projection 6 and an inner contour of the cavity 5 are substantially complementary with respect to one another.

After the joining-together of first 5 component 2 and second component 3, the sealing and/or connecting material 4 is cured, such that an elastic sealing and/or connecting element 8 is formed. By means of the sealing and/or connecting element 8, a secure and reliable connecting and/or sealing action between the first component 2 and the second component 3 is provided. In particular if the first component 2 and the second component 3 have different materials, relative movements between the first component 2 and the second component 3 can occur owing to external operating circumstances, such as for example a lift-off of the first component 2 from the second component 3 or different warming owing to different coefficients of thermal expansion. In particular, a movement counter to the second direction 200 would, in the case of known seals or connections from the prior art, lead to a reduction of the sealing and/or connecting action, because known seals or connections always require a contact pressure between the first component 2 and second component 3. By contrast, the component arrangement 1 according to the invention ensures an improved sealing and/or connecting force even if the first component 2 is moved relative to the second component 3 counter to the second force 200. By means of the club-like projection 6 and the deformed outer walls 7 of the cavity 5, a movement of the first component 2 counter to the second direction 200 leads to a compression of the connecting and/or sealing element 8 between the club-like projection 6 and the deformed outer walls 7.

As a result of the compression, an elevated pressure is exerted on the sealing and/or connecting element 8, whereby the sealing and/or connecting action is improved. An adequate sealing and/or connecting action between the first component 2 and the second component 3 thus exists in every situation, wherein said sealing and/or connecting action is even intensified in the event of a lift-off of the first component 2 from the second component 3.

Provision is made for the entire cavity 5 to be filled with the sealing and/or connecting material 4 such that the sealing and/or connecting element 8 is present within the entire cavity 5 and, depending on the usage situation, as far as the overflow chambers 10. This is advantageously achieved by virtue of sufficient sealing and/or connecting material 4 being introduced into the cavity 5 such that an introduction of the projection 6 into the cavity 5 leads to a displacement of a part of the sealing and/or connecting material 4 out of the cavity 5. The displaced sealing and/or connecting material 4 is subsequently received by the overflow chambers 10 of the first component 2. It is ensured in this way that the cavity 5 is completely filled with the sealing and/or connecting material 4 and thus with the sealing and/or connecting element 8, wherein, at the same time, no excess sealing and/or connecting material 4 remains in an uncontrolled manner between the first component 2 and the second component 3.

The deformation of the outer walls 7 may take place either plastically or elastically. If it is intended for the component arrangement 1 to be dismantled again, then an elastic deformation of the outer walls 7 is advantageously realized. This may be assisted by an application of a separating agent and/or lubricant before the introduction of the sealing and/or connecting material 4 with subsequent assembly of the components. If provision is not made for disassembly of the component arrangement 1, then the outer walls 7 may also be plastically deformed, and the separating agent or lubricant may be omitted. Provision is advantageously furthermore made for a maximum width of the club-like projection 6 to be smaller than a minimum opening width b of the deformed outer walls 7. A removal of the projection 6 from the cavity 5 is thus possible. Nevertheless, by means of the club-like form and the deformed outer walls 7, it is made possible for the sealing and/or connecting element 8 to be compressible between club-like projection 6 and deformed outer walls 7 if the first component 2 lifts off from the second component 3.

Figure 2:
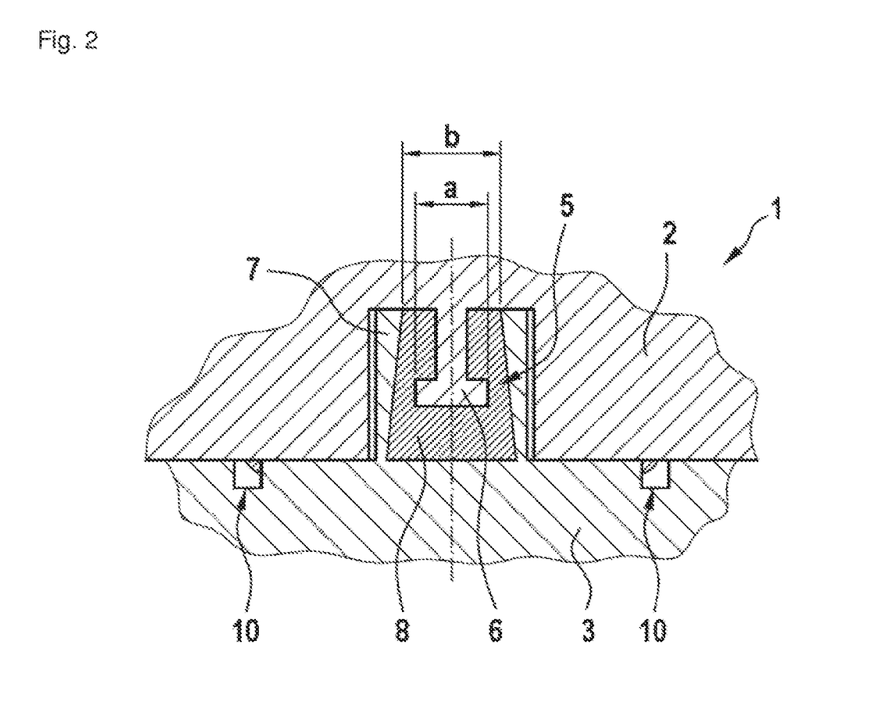
FIGS. 2 and 3A to 3D are schematic diagrams of component arrangements in a fully manufactured state.

FIG. 2 shows the component arrangement 1 as per a further exemplary embodiment of the invention. In turn, the component arrangement 1 has a first component 2 and a second component 3. Here, a cavity 5 is formed in the second component 3. The cavity 5 is, analogously to the previous exemplary embodiment, filled with a sealing and/or connecting material 4. Furthermore, the second component 3 has overflow chambers 10, analogously to the exemplary embodiment described above. The first component 2 has a projection 6 which is of T-shaped form. The T-shaped projection engages into the cavity. In the component arrangement 1 illustrated in FIG. 2, the first component 2 and the second component 3 are shown in a fully manufactured state, that is to say in a state in which the first component 2 and the second component 3 have been joined together. By means of the cavity 5 and the sealing and/or connecting material 4, the first component 2 and the second component 3 have been sealed off with respect to one another.

The cavity 5 is surrounded by outer walls 7 which narrow from a free end of the projection 6 toward a root region of the projection 6. Thus, analogously to the previous exemplary embodiment, a lift-off of the first component 2 from the second component 3 effects a compression of the sealing and/or connecting material 4 that has cured to form an elastic sealing and/or connecting element. Thus, the same advantages are achieved as in the exemplary embodiment described above. By contrast to the previous exemplary embodiment, the outer walls 7 of the second component 3 are not deformed during the joining-together of first component 2 and second component 3.

FIGS. 3A to 3D show component arrangements 1 as per further exemplary embodiments. The component arrangement 1 as per FIG. 3A comprises a first component 2, with a projection 6 which has an undercut 12, and a second component 3, which has a cavity 5 with an undercut 18. The two undercuts 12 and 18 are arranged opposite one another. A sealing and/or connecting material 4 that has cured to form a sealing and/or connecting element is arranged in the cavity 5, which material surrounds the projection 6, projecting into the cavity 5, of the first component 2. The cavity 5 substantially has a diameter which is constant over the height of the cavity. The projection 6 of the first component 2 also substantially has a continuously constant width or thickness. The undercut 12 of the projection 6 arises owing to the inclination of the projection 6 relative to a joining axis 15, which is shown orthogonally with respect to the parting plate 14 that runs between the first component 2 and the second component 3. The joining axis 15 runs parallel to the joining direction 200 and parallel to the intended loading direction of the component arrangement 1.

Figure 3A:
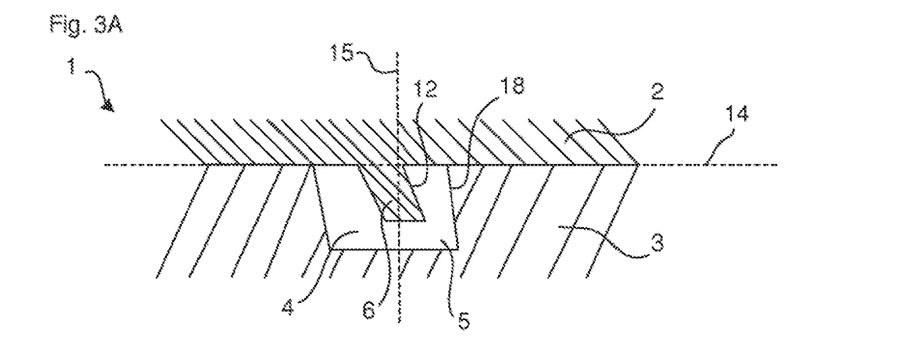
Figure 3B:
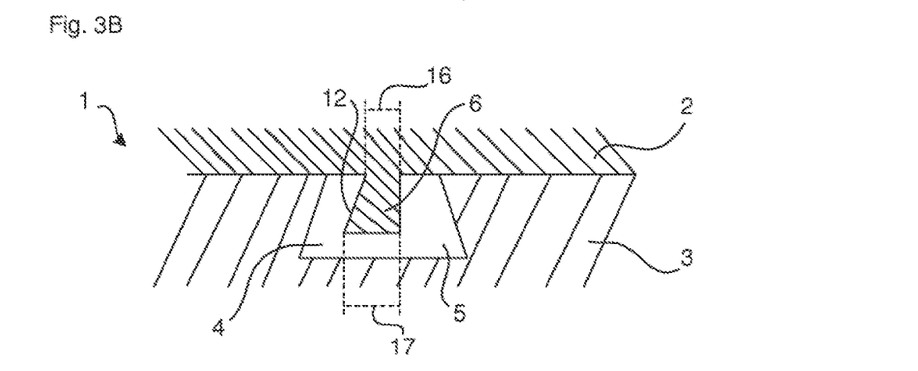

The component arrangement 1 as per FIG. 3B differs from the component arrangement 1 as per FIG. 3A in that the opening region of the cavity 5 is formed so as to be smaller than the base region of the cavity 5. In other words, the cavity 5 of the second component 3 narrows in the direction of the opening of the cavity 5. A further difference in relation to the exemplary embodiment as per FIG. 3B arises from the fact that the projection 6 of the first component 2 has a width which increases in the direction of the base region of the cavity 5, whereby the undercut 12 is formed. The projection 6 has a first width 16 and, in the immediate vicinity of the base region of the cavity 5, a second width 17, wherein the second width 17 is greater than the first width 16. In other words, the spatial extent of the projection 6 parallel to the base region of the cavity 5 is greater in a region arranged relatively close to the base region than in a region that is further remote from the base region of the cavity 5.

Figure 3C:
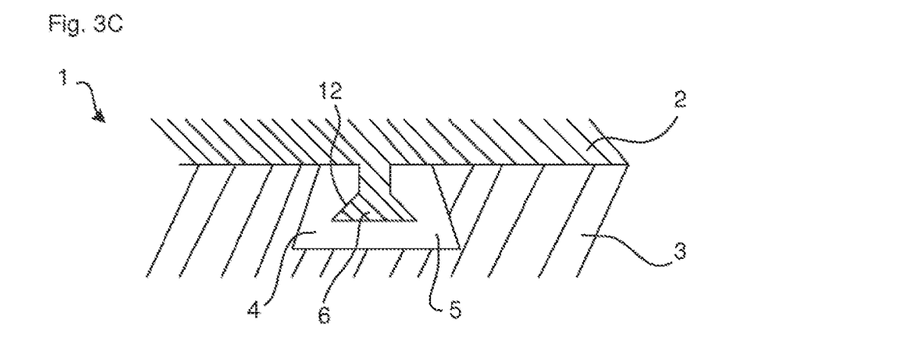
Figure 3D:
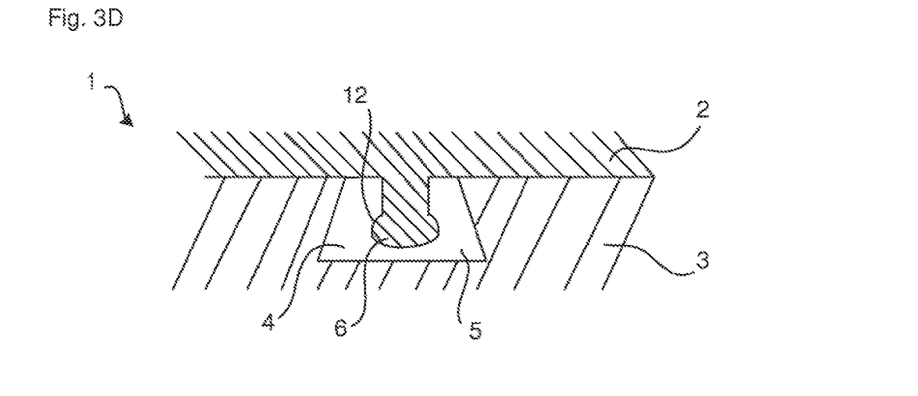

FIGS. 3C and 3D illustrate further exemplary embodiments of component arrangements 1, wherein the individual component arrangements 1 differ from the component arrangement 1 as per FIG. 3B by the shape and/or size of the projection 6. The first component 2 of the component arrangement 1 as per FIG. 3C has a first partial section, with a continuously constant width or a continuously constant diameter, and has a second partial section, the width or diameter of which increases in the direction of the base region of the cavity 5. The second partial section is in this case arranged closer to the base region of the cavity 5 than the first partial section. An undercut 12 of the projection 6 is formed by the second partial section which increases in size in the direction of the base region.

The projection 6 of the first component 2 of the component arrangement 1 as per FIG. 3D has a club-like form. By means of the club-like form, a partial section of the projection 6 which widens or increases in size in the direction of the base region of the cavity 5 is formed, whereby an undercut 12 is formed. The club-like form may be formed for example by means of a deformation step prior to the joining-together of the components 2, 3.

Figure 4A:
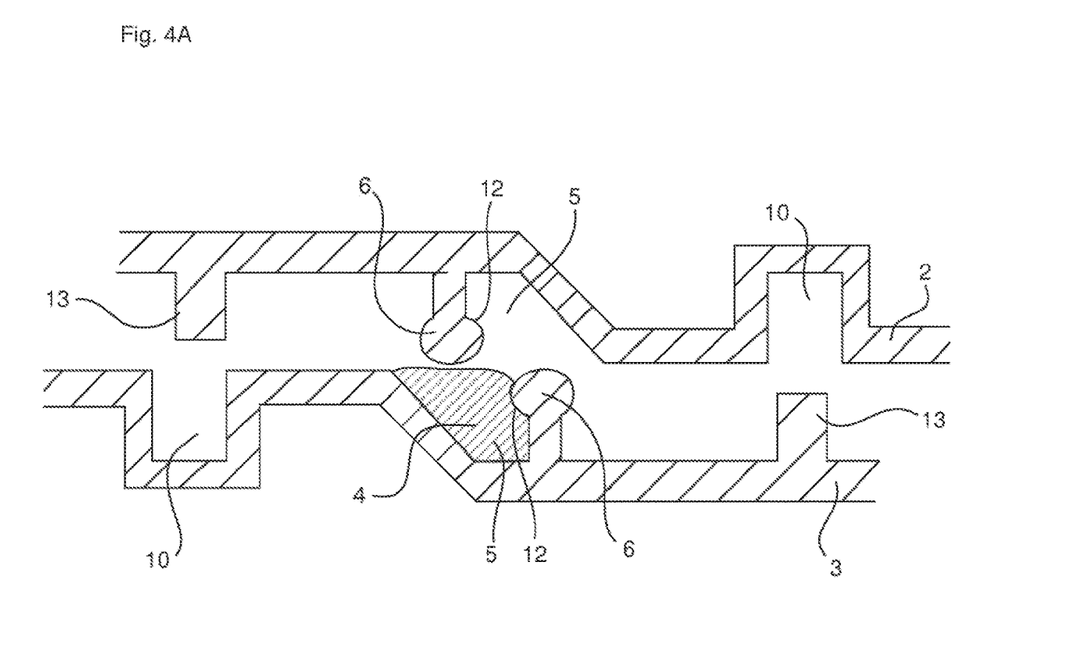
FIGS. 4A and 4B are schematic illustrations of a method for the connection of two components.
Figure 4B:
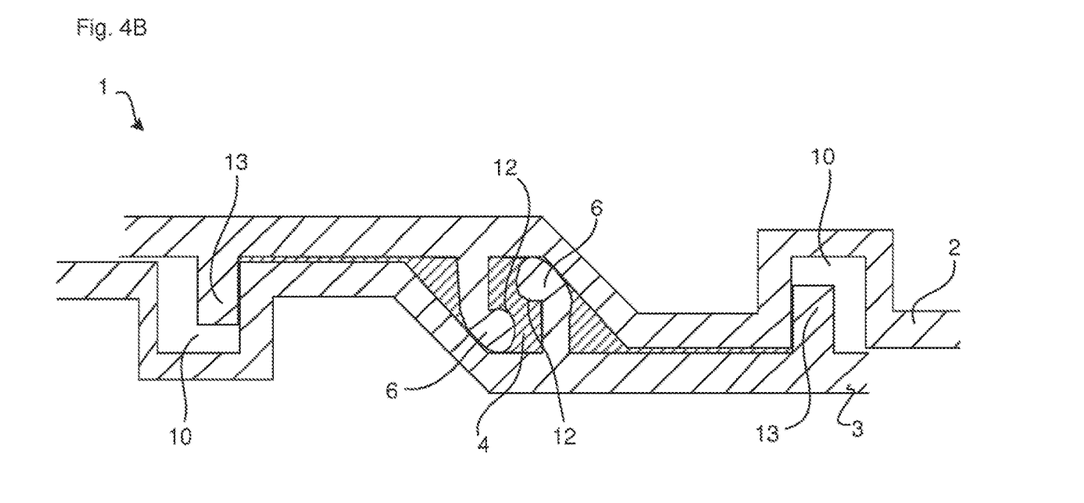

FIGS. 4A and 4B illustrate a method for producing a component arrangement 1 as per a further exemplary embodiment. Here, a first component 2 and a second component 3 are provided, wherein the components 2, 3 have in each case one cavity 5 and one projection 6 with an undercut 12. In the exemplary embodiment shown, the components 2, 3 are of identical or point-symmetrical form with regard to the surfaces that are to be connected. The components 2, 3 furthermore have in each case one overflow chamber 10 and one guide element 13, the functioning of which will be described in more detail below.

Before the joining-together of the components 2, 3, a sealing and/or connecting material 4 is introduced into the cavity 5 of the second component 3. The components 2, 3 are subsequently joined together such that the projection 6 of the first component 2 projects into the cavity 5 of the second component 3 and the projection 6 of the second component 3 projects into the cavity 5 of the first component 2. Furthermore, the projections 6 of the components 2, 3 are elastically or plastically deformed during the joining-together. After the joining-together, the projections 6 are surrounded by the sealing and/or connecting material 4, which can cure to form an elastic or solid sealing and/or connecting element. Sealing and/or connecting material 4 displaced by the projections 6 can be received in overflow chambers 10 of the components 2, 3. After the joining-together, the guide elements 13 of the components 2, 3 project into the overflow chamber 10 of the respective other component 2, 3, whereby lateral forces can be advantageously absorbed.

In principle, the projections 6 of FIGS. 3B to 3D may have a multiplicity of different possible shapes or sizes. The projections 6 preferably increase in size in the direction of the free end. The undercuts of the projections 6 and outer walls are preferably situated opposite the undercuts of the opposing walls in the cavities 5. The projections 6 and cavities 5 may be produced mechanically, chemically, electrochemically and/or thermally.

The features described in the exemplary embodiments shown may also be combined with one another in accordance with further exemplary embodiments. Alternatively or in addition, the exemplary embodiments shown in the figures may have further features as per the embodiments of the general description.

LIST OF REFERENCE DESIGNATIONS

1 Component arrangement
2 First component
3 Second component
4 Sealing/connecting material
5 Cavity
6 Projection
7 Outer wall
8 Sealing/connecting element
9 Opposing wall
10 Overflow chamber
11 Punch
12 Undercut
13 Guide element
14 Parting plane
15 Joining axis
16 First width
17 Second width
18 Undercut of the cavity
100 First direction
200 Second direction
a Maximum width
b Minimum opening width The foregoing disclosure has been set forth merely to illustrate the embodiments of the invention and is not intended to be limiting. Since modifications of the disclosed embodiments incorporating the spirit and substance of the invention may occur to persons having ordinary skill in the art, the invention should be construed to include everything within the scope of the appended claims and equivalents thereof.

What is claimed is:

1. A method for the connection of a first component to a second component, comprising the steps of:
   providing a first component which has a projection with an undercut,
   providing a second component which has a cavity,
   introducing a sealing and/or connecting material into the cavity of the second component,
   joining the first component and the second component together to form a component arrangement, wherein
      the projection of the first component projects, in the joined state, into the cavity of the second component, and
      the cavity is defined by two lateral projections which: i) project from the second component into a cavity defined by the first component, and ii) surround the projection of the first component.

2. The method as claimed in claim 1, wherein the sealing and/or connecting material is formed as a connecting material for a positively locking and/or non-positively locking connection of the components as an adhesive material.

3. The method as claimed in claim 1, wherein the sealing and/or connecting material is formed as a sealing material for sealing with respect to gaseous and/or liquid media.

4. The method as claimed in claim 1, wherein the sealing and/or connecting material is formed in combination as a connecting material for a positively locking and/or non-positively locking connection of the components and as sealing material.

5. The method as claimed in claim 4, wherein the cavity of the second component has an opening region and a base region, and the opening region is larger than the base region.

6. The method as claimed in claim 5, wherein the projection of the first component is of undercut form in relation to a joining axis which runs substantially parallel to an intended loading direction of the component arrangement in the joined state.

7. The method as claimed in claim 6, wherein the joining axis runs orthogonally with respect to a parting plane which, at least in sections, runs tangentially with respect to the opening region of the cavity of the second component.

8. The method as claimed in claim 7, wherein the projection of the first component has a first width and a second width, in the joined state, the second width is situated closer to the base region of the cavity of the second component than the first width, and the second width is greater than the first width.

9. The method as claimed in claim 8, wherein the sealing and/or connecting material cures to form an elastic or solid sealing and/or connecting element.

10. The method as claimed in claim 9, wherein the projection of the first component is of a thickening, club-like form, and/or is formed into a thickening, club-like form in a deformation step before the joining-together step.

11. The method as claimed in claim 10, wherein an outer wall of the cavity of the second component is deformed during the joining-together step.

12. The method as claimed in claim 11, wherein the first component has an opposing wall which, in the component arrangement, bears against the outer wall and which deforms the outer wall during the joining-together of the first component and second component.

13. The method as claimed in claim 12, wherein the outer wall is deformed such that a cross section of the cavity of the second component is of arcuate form.

14. The method as claimed in claim 1, wherein
   at least one outer wall of the cavity of the second component is deformed in relation to a state in which the second component is not connected to the first component, and
   the first component has at least one opposing wall which bears against the at least one outer wall such that the at least one outer wall is deformed.

15. A component arrangement, comprising
   a first component, which has a projection with an undercut,
   a second component, which has a cavity and which is connected to the first component,
   a sealing and/or connecting material which has cured to form a sealing and/or connecting element and which is arranged in the cavity of the second component, wherein
      the projection of the first component projects into the cavity and is at least partially surrounded by the sealing and/or connecting element, and
      the cavity is defined by two lateral projections which: i) project from the second component into a cavity defined by the first component, and ii) surround the projection of the first component.

16. The component arrangement as claimed in claim 15, wherein at least one outer wall of the cavity of the second component is deformed in relation to a state in which the second component is not connected to the first component.

17. The component arrangement as claimed in claim 16, wherein the first component has at least one opposing wall which bears against the at least one outer wall such that the at least one outer wall is deformed.

18. The component arrangement as claimed in claim 17, wherein the first component and/or the second component have an overflow chamber in which any of the sealing and/or connecting material that has emerged from the cavity of the second component is collected.

19. A component arrangement, comprising
- a first component, which has a projection with an undercut,
- a second component, which has a cavity and which is connected to the first component,
- a sealing and/or connecting material which has cured to form a sealing and/or connecting element and which is arranged in the cavity of the second component, wherein
  - the projection of the first component projects into the cavity and is at least partially surrounded by the sealing and/or connecting element,
  - at least one outer wall of the cavity is deformed in relation to a state in which the second component is not connected to the first component, and
  - the first component has at least one opposing wall which bears against the at least one outer wall such that the at least one outer wall is deformed.

* * * * *